E. N. LIGHTFOOT.
HEAT REGULATING SYSTEM.
APPLICATION FILED OCT. 10, 1916.
1,314,881.
Patented Sept. 2, 1919.
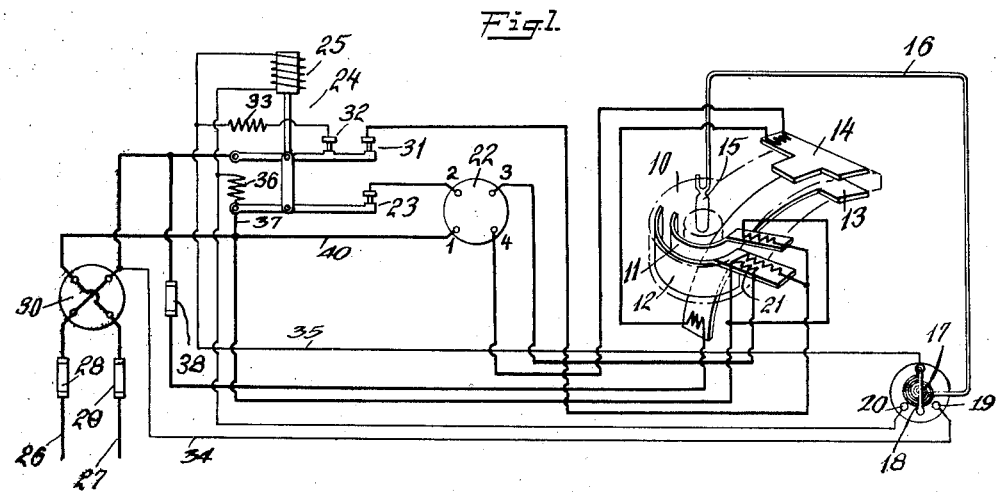
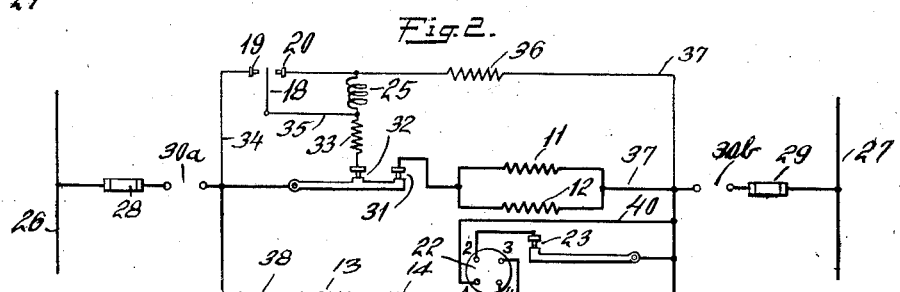
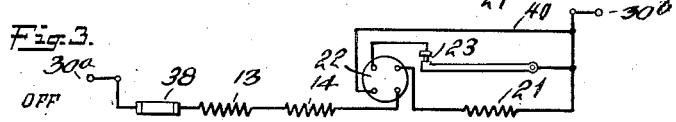
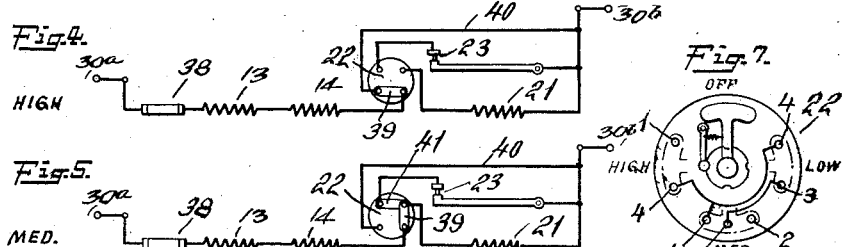
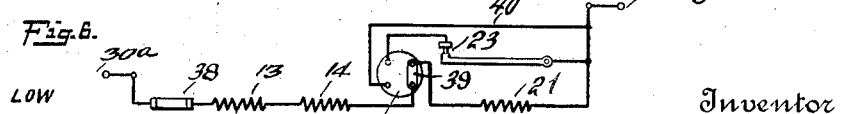

UNITED STATES PATENT OFFICE.

EDWIN N. LIGHTFOOT, OF NEW YORK, N. Y., ASSIGNOR TO THE CUTLER-HAMMER MFG. CO., OF MILWAUKEE, WISCONSIN, A CORPORATION OF WISCONSIN.

HEAT-REGULATING SYSTEM.

1,314,881.     Specification of Letters Patent.     Patented Sept. 2, 1919.

Application filed October 10, 1916. Serial No. 124,802.

*To all whom it may concern:*

Be it known that I, EDWIN N. LIGHTFOOT, a citizen of the United States of America, and a resident of New York, county and State of New York, have invented certain new and useful Improvements in Heat-Regulating Systems, of which the following is a specification, reference being had to the accompanying drawings, forming a part thereof.

My invention relates to heat regulating systems.

It is particularly adapted for regulating electrically heated crucibles, such, for example, as the metal melting crucibles of linotype and other type-casting machines.

One of the objects of my invention is to provide an improved heat regulating system for maintaining the crucible temperature at a substantially constant average.

Another object is to provide a heat regulating system which can be readily adjusted to meet varying service conditions.

Another object is to provide for a wider range of heat supply for the crucible outlet, in order that the metal may be delivered at a more uniform temperature.

Other objects and advantages will appear from the specification and claims.

It is of course well understood that linotype and other type-casting machine crucibles are subjected to conditions which vary over wide limits; for example, one machine may be utilized on book work where large amounts of metal are continuously being used, and another for newspaper work where fine print and short lines are used, and the amount of metal is relatively small. In fact, the same machine may be utilized at one time for one kind of work and for another kind of work at a different time.

According to my present invention I provide a simple and reliable regulating system for the crucible heaters embodying a simple switching device, such as for example a snap switch having a plurality of positions to which the switch may be readily adjusted to suit the various conditions of service.

In order that my invention may be thoroughly understood I will now proceed to describe the same in the following specification, and then point out the novel features thereof in appended claims.

Referring to the drawings:

Figure 1 is a diagrammatic view which illustrates an embodiment of my invention and in which the crucible is shown in outline perspective, together with the electric heaters and regulating thermometer which are associated therewith.

Fig. 2 is a diagram which clearly indicates the circuit connections for the heaters and the regulating system.

Figs. 3, 4, 5 and 6 are simple diagrams showing the branch of the system which includes the adjusting switch, and clearly indicating the circuit connections established, for each of the several positions of the adjusting switch.

Fig. 7 indicates one way in which the contact members of the adjusting switch may be constructed.

In the drawings, a linotype crucible or the like, is shown in broken lines in Fig. 1, and is designated 10. The body of the crucible has a pair of electric heaters 11 and 12 which dip into the molten metal, and the crucible is furthermore equipped with a throat heater 13 and a mouth heater 14. For convenience of illustration the heating elements of the throat and mouth heaters are shown diagrammatically in Fig. 1 at the bottom and left respectively of these heaters while the heating elements of the body heaters are shown at the right of their respective heaters.

A thermometer bulb 15 extends into the metal in the body of the crucible and is connected by a tube 16, to a spiral actuator 17 which governs the action of a movable contact arm 18. This arm is adapted to engage one or the other of a pair of spaced contacts 19 and 20 according as the temperature of the metal in the body of the crucible rises above or falls below a predetermined value.

The mouth and throat heaters are governed by a regulating resistance 21 which preferably forms a part of the crucible body heater 12. By this means the heat generated in the regulating resistance is not lost but is given up to the metal in the body of the crucible.

The mouth and throat heaters are further regulated and controlled by a four-point snap switch or other hand-controlled adjusting means 22 and by one section 23 of a magnet switch 24 which is actuated by a magnet 25.

The regulating system and the heaters are supplied with energy from any suitable source represented by line conductors 26—27, the supply of energy being primarily governed by line fuses 28 and 29 and a double pole line switch 30. I prefer to use a snap switch for this purpose.

In addition to the switch section 23 the magnet switch comprises a section 31 which is adapted to open and close the circuit for the crucible body heaters 11 and 12, and has auxiliary switch contacts 32 which close a holding or maintaining circuit through the magnet winding 25, a resistance 33 being preferably interposed between the contacts 32 and the coil as shown in Figs. 1 and 2.

The movable regulator contact 18 is connected as hereinafter explained, so as to either complete a circuit through the magnet coil 25 which is thereby energized to actuate the magnet switch 24, or a shunt circuit around the magnet coil, which is thereby de-energized and permits the magnet switch to open.

The circuit connections are clearly brought out in the simplified diagram Fig. 2 although the poles of the line switch 30 are separated and are designated $30^a$ and $30^b$, and the parts of the magnet switch are also separated as they are in separate branches of the circuit.

Referring particularly to Fig. 2, let it be assumed that the line switch 30 is closed and that, because the temperature of the metal is below a predetermined amount, the regulating arm 18 is in engagement with contact 19. Circuit is then established from line conductor 26 through fuse 28, line switch pole $30^a$, conductor 34, contacts 19 and 18, conductor 35, magnet coil 25, resistance 36 which is not necessary, but may be used to reduce the voltage applied to the magnet coil, conductor 37, pole $30^b$ of line switch, and fuse 29, to the line conductor 27. The coil 25 is thus energized and actuates the magnet switch, closing the groups of contacts 23, 31 and 32, as shown in Fig. 1. The closing of contacts 32 establishes a holding circuit from switch pole $30^a$, contacts 32, resistance 33, coil 25, and resistance 36, to conductor 37 and switch pole $30^b$. This circuit holds the magnet switch closed until the regulator arm 18 is swung into engagement with contact 20. This transfer of contact 18 only takes place when the temperature of the metal in the body of the crucible exceeds a predetermined amount.

A main heating circuit is established from the switch pole $30^a$ through contacts 31 and crucible heaters 11 and 12 which are connected in multiple relation, to switch pole $30^b$.

A third branch of the circuit includes a fuse 38, throat heater 13, mouth heater 14, regulating resistance 21, contacts 23, of the magnet switch, and the adjusting switch 22. This branch of the circuit is governed by the adjusting switch 22 which is adapted to occupy four positions, designated "Off," "High," "Medium," and "Low," and the circuit connections for which are indicated in Figs. 3, 4, 5 and 6 respectively.

The operation of the system will be understood from the following:—When the adjusting switch occupies its "Off" position, the connections are as shown in Figs. 2 and 3, the mouth and throat heaters being de-energized and the branch in which they are located being open circuited. The crucible heaters 11 and 12 are maintained in circuit or cut out, dependent upon the action of the automatic switch contacts 31. In other words, only the crucible or body heaters are active and they are dependent upon the action of the temperature responsive regulator.

If the adjusting switch is now moved to position marked "High" in Fig. 7, the circuit connections for the branch which includes the mouth and throat heaters are as shown in Fig. 4. It is evident that the mouth and throat heaters are now connected in series relation, circuit being completed through the fuse 38, the heaters 13 and 14, contact 39 of the adjusting switch 22 and conductor 40, to the switch pole $30^b$. The mouth and throat heaters in this position are continually energized since they are evidently independent of the automatic switch.

In order to make the mouth and throat heaters dependent upon the automatic switch the adjusting switch 22 is thrown to position marked "Med." in Fig. 7, the circuit connections then being established as shown in Fig. 5. When the automatic switch is closed, circuit is completed from switch pole $30^a$ through fuse 38, heaters 13 and 14, switch contacts 39 and 41, and automatic switch contacts 23 to switch pole $30^b$. However, when the automatic switch is open, the mouth and throat heaters are not open-circuited, the circuit being completed from switch contact 39 through regulating resistance 21. The amount of heat generated in the mouth and throat heaters is thus reduced and the heat generated in the regulating resistance 21 is supplied to the crucible in addition to that generated in crucible heaters 11 and 12.

When the adjusting switch 22 is thrown to the position marked "Low" in Fig. 7, the automatic switch is again cut out as far as its action upon the mouth and throat heaters is concerned, but circuit is continuously maintained through the mouth and throat heaters and through the regulating resistance 21. Thus a low heat is generated in the mouth and throat heaters all the time.

It will be readily understood by those skilled in this art that any ordinary service conditions may be very closely met by selecting the suitable position for the adjusting switch and in general I believe it is preferable to increase the amount of heat supplied to the mouth and throat for light work, when the mass of hot metal going through is small and vice versa.

Attention is particularly directed to the fact that in each of the positions of the adjusting switch, the crucible heaters are automatically regulated in accordance with the temperature variations in the metal in the body of the pot so that the metal is always maintained in a suitable condition therein.

While I have outlined in a general way the service conditions which may be met by different positions of the regulating switch, my invention is by no means limited to any definite or predetermined arrangement and the regulating switch may be adjusted to the position which is found in service to be best adapted for the conditions under which the pot is operating at the time.

It is evident that the circuit connections may be varied and other modifications effected within the spirit and scope of my invention, and I intend that only such limitations be imposed as are indicated in the appended claims.

What I claim is:

1. A heat regulating system for receptacles, comprising a body heater, an outlet heater, a regulating switch dependent upon the variations in temperature in the body, and means for adjusting the connections to the outlet heater to either open the circuit of said outlet heater, connect it in circuit independently of the regulating switch, or make it dependent upon the action of said regulating switch.

2. A heating system for type-casting machine crucibles comprising a body heater, throat and mouth heaters, a thermometer extending into the body, a regulator dependent upon the thermometer, an automatic switch dependent upon the regulator for continuously governing the circuit for the body heaters, and an adjusting switch adapted to make the mouth and throat heaters inactive or also dependent upon the automatic switch as desired.

3. A heating system for type-casting machine crucibles comprising a body heater, throat and mouth heaters, a thermometer extending into the body, a regulator dependent upon the thermometer, an automatic switch dependent upon the regulator for continuously governing the circuit for the body heaters, and an adjusting switch adapted to make the mouth and throat heaters either dependent upon the automatic switch, independent thereof or inactive.

4. A heat regulating system for type-casting machine crucibles comprising an automatic regulating switch responsive to temperature variations in the crucible, a body heater dependent upon said regulating switch, an outlet heater, and means for adjusting the system to varying service conditions, by making the body and outlet heaters either dependent or independent of the regulating switch or the body heater dependent and the outlet heater independent of the regulating switch.

5. A heat regulating system for type-casting machine crucibles comprising an automatic regulating switch, responsive to temperature variations in the crucible, a body heater continuously dependent upon said regulating switch, an outlet heater, and means for establishing circuit connections therefor, and means for completing a branch circuit including either the outlet heater alone, or the regulating switch, a resistance and the outlet heater together.

6. A type-casting machine crucible heating system having a body heater, an outlet heater, means governed by the temperature in the body for controlling the body heater, and means for providing three conditions of heat to the outlet heater.

7. A type-casting machine crucible heating system having a body heater, an outlet heater, means governed by the temperature in the body for controlling the body heater, and means for providing three conditions of heat to the outlet heater, the intermediate condition being governed by said first mentioned means.

8. A type-casting machine crucible heating system having a body heater for the metal in the body of the crucible, a regulator controlled by the temperature of the metal in the crucible body for governing the heat provided by said body heater, an outlet heater for heating the metal passing from the body of the crucible, and means adapted to place the outlet heater in any one of four conditions whereby no heat, a relatively high range, a medium range or a low range of heat may be applied thereby, the medium heat range being under the control of said regulator.

9. A heat regulating system for type-casting machine crucibles having a heater for heating the metal in the body of the crucible, means for heating the metal passing from the body of the crucible, an automatic temperature controlled regulator for controlling the heat supplied by the heaters, and a single switch adapted to be moved to various positions, whereby all heat is turned off, both heaters are placed under the control of said regulator, or one or both heaters supply heat independently of said regulator.

10. A heating system for type-casting machine crucibles having a regulator automatically controlled by the temperature of the metal, a body heater for heating the metal in the body of the crucible, a heater for heating the metal leaving the crucible, a switch capable of being moved to a plurality of positions, and means coöperating with said switch, heaters and regulator whereby said switch renders said heaters inactive or places both heaters under control of said regulator.

11. A type-casting machine crucible heating system having a body heater, an outlet heater, a heat regulator governed by the temperature in the body for controlling said body heater, and means for providing three conditions of heat for said outlet heater, one of said conditions being kept between limits by said regulator.

12. A type-casting machine crucible heating system having an electric body heater, an electric outlet heater, a heat regulator for controlling the current supplied to said body heater, and a switch for providing two different values of current to said outlet heater to establish two heat conditions independent of said regulator and for bringing the current supplied to said outlet heater under the control of said regulator.

13. A heat regulating system for melting crucibles which have body and outlet heaters, comprising means governed by the temperature in the crucible body for controlling the body heater, and means for providing three conditions of heat to the outlet heater.

14. A heat regulating system for melting crucibles which have body and outlet heaters, comprising an automatic regulator governed by the temperature in the crucible body for controlling the body heater, and means for providing three conditions of heat to the outlet heater, one of said conditions being under the control of the regulator.

In witness whereof I have hereunto set my hand this 6th day of October, 1916.

EDWIN N. LIGHTFOOT.

Witnesses:
 G. P. BROCKWAY,
 H. J. EULER.